United States Patent
Cai et al.

(10) Patent No.: US 7,877,487 B2
(45) Date of Patent: Jan. 25, 2011

(54) DYNAMIC SERVICE TRIGGERS IN COMMUNICATION NETWORKS

(75) Inventors: Yigang Cai, Naperville, IL (US); Shufang Zhang, QingDao (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 895 days.

(21) Appl. No.: 11/618,302

(22) Filed: Dec. 29, 2006

(65) Prior Publication Data

US 2008/0162705 A1     Jul. 3, 2008

(51) Int. Cl.
    G06F 15/16     (2006.01)
(52) U.S. Cl. ........................ 709/227; 709/228
(58) Field of Classification Search .......... 709/227, 709/228, 230, 231
    See application file for complete search history.

(56) References Cited

U.S. PATENT DOCUMENTS

| | | | | |
|---|---|---|---|---|
| 2005/0190772 A1* | 9/2005 | Tsai et al. | ............... | 370/395.52 |
| 2006/0253538 A1 | 11/2006 | Jung et al. | | |
| 2007/0064886 A1* | 3/2007 | Chiu et al. | ............... | 379/88.17 |
| 2007/0263808 A1* | 11/2007 | Van Wyk et al. | ....... | 379/142.01 |
| 2008/0049734 A1* | 2/2008 | Zhakov et al. | ............... | 370/352 |
| 2008/0062974 A1* | 3/2008 | Kikinis et al. | ............... | 370/356 |

FOREIGN PATENT DOCUMENTS

| EP | 1 675 347 A | 6/2006 |
|---|---|---|
| WO | WO 03/058918 A | 7/2003 |

OTHER PUBLICATIONS

"Digital cellular telecommunications system (phase 2+); Universal Mobile Telecommunications System (UMTS); IP Multimedia (IM) session handling; IM call model; Stage 2 (3GPPTS 23.128 version 7.3.1 Release 7); ETSI TS 123 218," vol. 3-CN1, No. V7.3.1, Oct. 1, 2006, ETSI Standards, LIS, Sophia AntiPolis Cedex, France.

* cited by examiner

*Primary Examiner*—Hussein A Elchanti
(74) *Attorney, Agent, or Firm*—Duft Bornsen & Fishman LLP

(57) ABSTRACT

Communication networks and associated methods are disclosed for dynamically defining service triggers. Responsive to receiving a session initiation message for a session, an application server defines one or more subsequent service triggers for a service provided by the application server for the session. The subsequent service triggers identify messages or conditions for the session of which the application server desires to be notified. The application server then transmits the subsequent service triggers to a session control function that is setting up or maintaining the session. The session control function then receives a subsequent message for the session. The session control function processes the subsequent message and the subsequent service triggers to determine whether to transmit the subsequent message to the application server.

20 Claims, 7 Drawing Sheets

US 7,877,487 B2

DYNAMIC SERVICE TRIGGERS IN COMMUNICATION NETWORKS

BACKGROUND OF THE INVENTION

1. Field of the Invention

The invention is related to the field of communications and, in particular, to defining dynamic service triggers in communication networks. More particularly, application servers (AS) in a communication network define service triggers to indicate which messages they want or need to receive for a session.

2. Statement of the Problem

One type of communication network gaining popularity is an IP Multimedia Subsystem (IMS) network. As set forth in the 3$^{rd}$ Generation Partnership Project (3GPP) or 3GPP2, IMS provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network, as IP networks have become the most cost savings bearer network to transmit video, voice, and data. The signaling used within IMS networks is typically Session Initiation Protocol (SIP). IMS defines the standard SIP interface between application servers, the IMS core network (CSCF), and the IMS subscriber. These standards can reduce the network integration costs and let the subscriber enjoy more stable services.

In an IMS network, user equipment of a calling party registers with the IMS network through an access network, such as a CDMA network, a GSM network, an IP network, a WiFi network, a WiMAX network, etc. Registration is typically performed by the user equipment transmitting a SIP REGISTER message to the access network. The access network routes the REGISTER message to the IMS network. A serving-call session control function (S-CSCF) in the IMS network receives the REGISTER message. The S-CSCF that is serving the user equipment of the calling party is referred to as the originating S-CSCF. Responsive to receiving the REGISTER message, the originating S-CSCF queries a Home Subscriber Server (HSS) for a user profile for the calling party. The user profile includes Initial Filter Criteria (iFC) that indicates service triggers and other triggering information for one or more services subscribed to by the calling party. The originating S-CSCF then stores the iFC for the calling party.

To initiate a session with a called party, the user equipment of the calling party transmits a SIP INVITE message to the IMS network through the access network. The INVITE message may be considered the session initiation message. The originating S-CSCF receives the INVITE message, and processes the iFC to determine which services may be triggered responsive to the INVITE message. If one or more services are triggered, then the originating S-CSCF identifies the application servers (AS) that provide such services in the IMS network, and also identifies routing information for the application servers. The originating S-CSCF then routes the INVITE message to the application servers based on the routing information.

The application servers receive the INVITE message and operate in a manner to provide a service or initialize a service. The originating S-CSCF then transmits the INVITE message to another S-CSCF that is serving user equipment of the called party. The S-CSCF that is serving the user equipment of the called party is referred to as the terminating S-CSCF. The terminating S-CSCF and the originating S-CSCF then attempt to establish the session.

As part of establishing or maintaining the session, the originating S-CSCF receives subsequent messages from the terminating S-CSCF and the user equipment of the calling party. Subsequent messages comprise any messages that are received subsequent to the session initiation message. For instance, originating S-CSCF may receive a SIP 183 message or a SIP 200 OK message from the terminating S-CSCF, or may receive a SIP UPDATE message from the user equipment of the calling party. Responsive to receiving a subsequent message for the session, the originating S-CSCF identifies the application servers that are in the signaling path established during session initiation. The originating S-CSCF then transmits the subsequent message to each of the application servers. The same process is repeated for each subsequent message that the originating S-CSCF receives for the session. A similar process is performed in the terminating S-CSCF.

One problem with present IMS networks is that the S-CSCF transmits subsequent messages to all of the application servers that are providing a service for the session as triggered by the iFC, even if the application servers do not need to receive the subsequent message to perform the service. As an example, assume that an application server provides a prepaid service for a session. The application server needs to be notified when the session starts and ends to determine prepaid charging information for the session, but may not need to be notified of other status-type messages, such as a SIP 183 message or a SIP UPDATE message. In this example, the application server will receive one or more subsequent messages from the S-CSCF even though the application server does not need to receive these subsequent messages. Transmitting unnecessary messages between an S-CSCF and application servers may congest the network, may produce longer call setup delays, and may waste processing time in the network nodes that have to process these unnecessary messages.

SUMMARY OF THE SOLUTION

The invention solves the above and other problems by dynamically defining service triggers in the application servers for subsequent messages received for a session, and transmitting the service triggers to a session control function (e.g., an S-CSCF) that is serving the session. When the session control function receives a subsequent message for a session, the session control function processes the service triggers to identify one or more application servers that requested to be notified of the subsequent message, and transmits the subsequent message to the identified application servers. By defining the service triggers for subsequent messages in the application server, the session control function does not transmit the subsequent messages to all of the application servers that are providing a service for the session as is presently done. The subsequent messages are transmitted to the application servers that have defined a service trigger for that particular message or message type, which eliminates the transmission of unnecessary messages in the network. Network bandwidth and processing time may thus be advantageously saved.

One embodiment of the invention comprises a communication network adapted to define dynamic service triggers. The communication network includes one or more application servers and a session control function. The session control function is adapted to receive a session initiation message (e.g., a SIP INVITE message) for a session in the communication network. The session control function is further adapted to identify one or more initial service triggers for the session, and transmit the session initiation message to one or more of the application servers based on the initial service triggers. Responsive to receiving the session initiation message, an application server is adapted to process the session initiation message to define one or more subsequent service triggers for a service provided by the application server for the session. The application server is further adapted to transmit the subsequent service triggers to the session control function. The session control function is further adapted to receive a subsequent message (e.g., a SIP 200 OK (INVITE) message) for the session. The session control function is further adapted to process the subsequent message and the subsequent service triggers to determine whether to transmit the subsequent message to the application server. The session control function performs a similar process for other application servers that transmit subsequent service triggers to the session control function.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
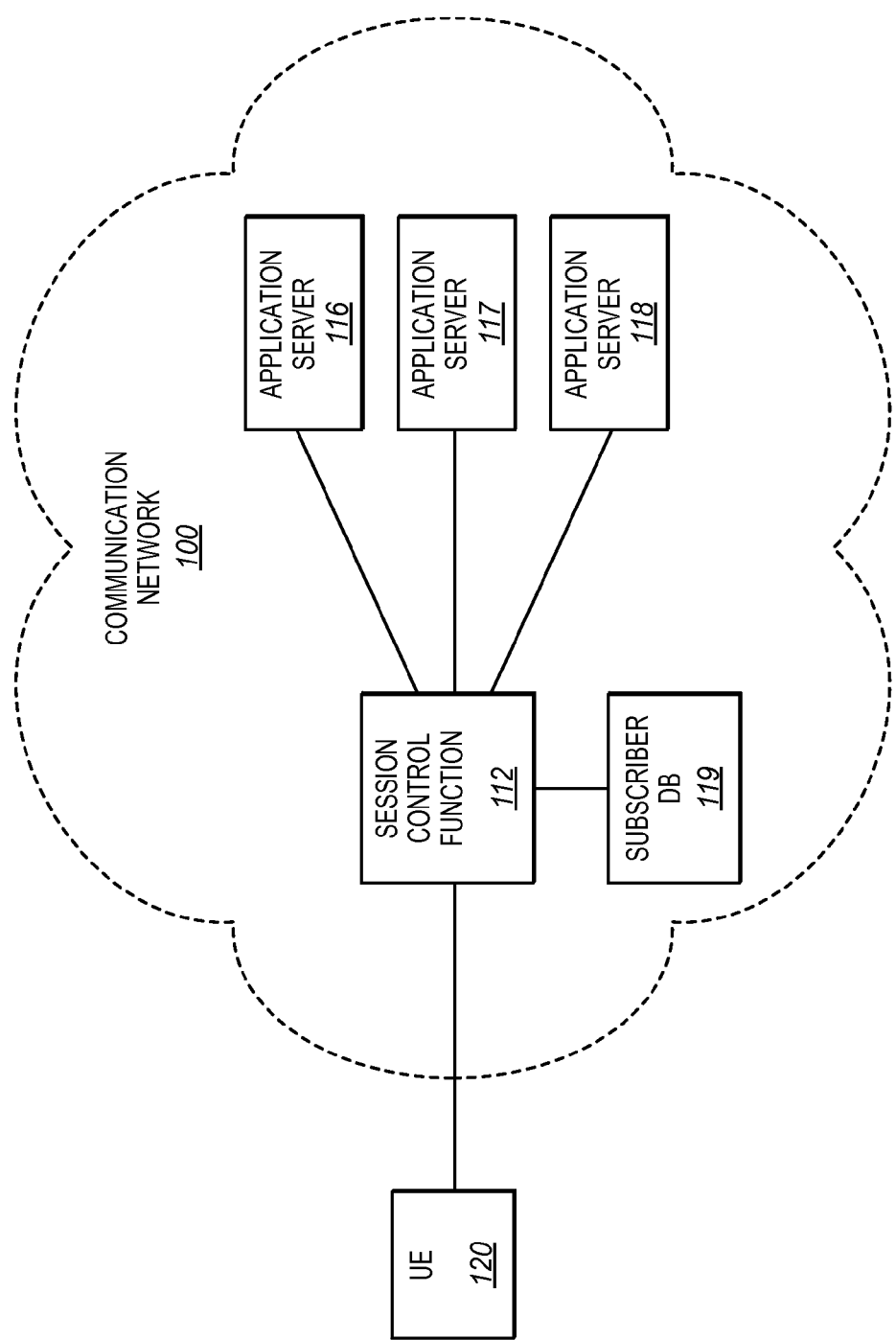
FIG. 1 illustrates a communication network in an exemplary embodiment of the invention.

FIG. 1 illustrates a communication network 100 in an exemplary embodiment of the invention. Communication network 100 includes a session control function 112, a plurality of application servers 116-118, and a subscriber database 119. One example of communication network 100 is an IMS network. Session control function 112 comprises any system, server, or network node adapted to set up, maintain, and/or tear down sessions or dialogs in communication network 100. One example of session control function 112 is a serving-call session control function (S-CSCF) in an IMS network. Application servers 116-118 comprise any system, server, or network node adapted to provide services for a session or dialog in communication network 100. Examples of application servers 116-118 include an IMS application server (IMS AS) based on an Open Service Architecture Service Capability Server (OSA SCS) or an IP Multimedia-Service Switching Function (IM-SSF), and an Open Mobile Alliance application server (OMA AS). Subscriber database 119 comprises any system, server, or network node that stores user profiles and other user information. One example of subscriber database 119 includes a Home Subscriber Server (HSS). Session control function 112 and application servers 116-118 may represent the originating side or the terminating side of a session.

Assume for this embodiment that user equipment (UE) 120 initiates a session through communication network 100. The term "session" as used herein applies to sessions, calls, or dialogs in communication network 100. Before initiating the session, UE 120 registers with session control function 112. UE 120 transmits a register message (e.g., a SIP REGISTER message) to session control function 112. Responsive to the register message, session control function 112 registers UE 120 with communication network 100 and may access a user profile associated with UE 120 from subscriber database 119. UE 120 is then prepared to initiate the session by transmitting a session initiation message to session control function 112. One example of a session initiation message is a SIP INVITE message. Communication network 100 then operates as described in FIG. 2 to set up or maintain the session.

Figure 2:
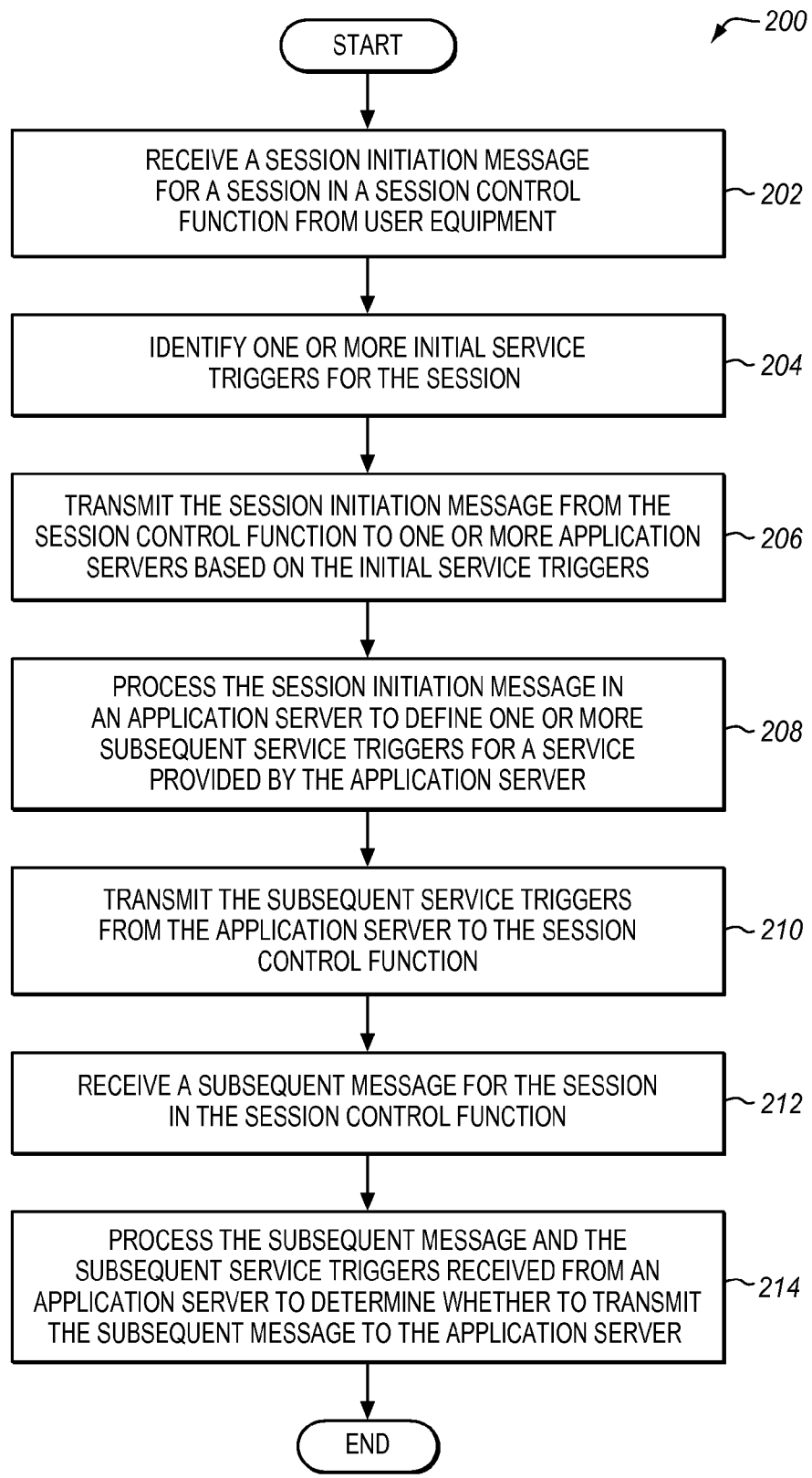
FIG. 2 is a flow chart illustrating a method of operating a communication network to define dynamic service triggers in an exemplary embodiment of the invention.

FIG. 2 is a flow chart illustrating a method 200 of operating communication network 100 to provide dynamic service triggers in an exemplary embodiment of the invention. The steps of method 200 will be described with reference to communication network 100 in FIG. 1. The steps of the flow chart in FIG. 2 are not all inclusive and may include other steps not shown.

In step 202 of method 200, session control function 112 receives the session initiation message for the session from UE 120. Responsive to receiving the session initiation message, session control function 112 identifies one or more initial service triggers (or Service Point Triggers (SPT)) for the session in step 204. One example of initial service triggers includes Initial Filter Criteria (iFC) that indicates one or more initial service triggers for a session. Session control function 112 may already store the initial service triggers. For instance, session control function 112 may request a user profile for UE 120 responsive to UE 120 registering with session control function 112, where the user profile includes the initial service triggers. Alternatively, session control function 112 may request the initial service triggers responsive to receiving the session initiation message by querying subscriber database 119 for the initial service triggers. In step 206, session control function 112 transmits the session initiation message to one or more of application servers 116-118 based on the initial service triggers. The initial service triggers indicate which services are being subscribed to by the user of UE 120. The initial service triggers also indicate which application servers 116-118 are providing those services. Thus, session control function 112 can identify which application servers 116-118 will be used for the session, identifies routing information for the application servers 116-118, and then transmits the session initiation message to the appropriate application servers 116-118.

Responsive to receiving a session initiation message, an application server (assume application server 116) processes the session initiation message to define one or more subsequent service triggers (or Service Point Triggers (SPT)) for a service provided by the application server 116 for the session in step 208. A subsequent service trigger comprises any condition that elicits an action from an application server responsive to a subsequent message. As an example, if application server 116 provides a prepaid service, then application server 116 may define a plurality of subsequent service triggers indicating the subsequent messages that application server 116 needs to receive to perform the prepaid service. As another example, if application server 116 provides a call transfer service, then application server 116 may define a plurality of subsequent service triggers indicating the subsequent messages that application server 116 needs to receive to perform the call transfer service. In step 210, application server 116 transmits the subsequent service triggers to session control function 112. Each of the other application servers 117-118 receiving the session initiation message may perform a similar process.

Application servers 116-118 may define the subsequent service triggers in different ways. For example, application servers 116-118 may process the session initiation message to define Subsequent Filter Criteria (sFC) indicating the subsequent service triggers or other triggering information for the service provided by an application server. Application servers 116-118 may format an sFC body in XML format (or another format), and include the subsequent service triggers in the sFC body. Application servers 116-118 may then embed the sFC body in the session initiation message, such as the SIP INVITE request message, and transmit the session initiation message to session control function 112. Responsive to receiving the session initiation message that includes the sFC body, session control function 112 strips the sFC body from the session initiation message before forwarding the session initiation message to a terminating device. Session control function 112 also stores the sFC.

Application servers 116-118 may alternatively embed the sFC body in another type of message other than the session initiation message. For back-to-back user agent (B2BUA) model, an application server may embed the sFC in a SIP request message (e.g., the session initiation message) because the application server initiates a new SIP dialog. However, for non-B2BUA model, the application server may embed the sFC in a SIP response message. For example, a session control function may send a non-B2BUA application server a SIP request message, and the application server will respond in the same dialog. Thus, the application server embeds the sFC in a SIP response message (e.g., a SIP 200 OK message) and the session control function saves the sFC.

In step 212, session control function 112 receives a subsequent message for the session. As previously stated, a subsequent message comprises any message received subsequent to the session initiation message. Responsive to receiving the subsequent message, session control function 112 processes the subsequent message and the subsequent service triggers received from one or more of application servers 116-118 to determine whether to transmit the subsequent message to the application servers 116-118 in step 214. For instance, if session control function 112 receives subsequent service triggers from application server 116, then session control function 112 processes the subsequent message and the subsequent service triggers from application server 116 to determine whether to transmit the subsequent message to application server 116. If session control function 112 receives subsequent service triggers from application server 117, then session control function 112 processes the subsequent message and the subsequent service triggers from application server 117 to determine whether to transmit the subsequent message to application server 117.

If a determination is made to transmit the subsequent message to an application server 116-118 based on the service triggers, then session control function 112 transmits the subsequent message to the appropriate application server(s) 116-118, and prepares to process the message from the application server after service handling. Session control function 112 may already have routing information for the application servers 116-118 from the routing of the session initiation message to application servers 116-118, such as in a Via header or Record-Route header. If a determination is made to not transmit the subsequent message to an application server 116-118 based on the service triggers, then session control function 112 does not transmit the subsequent message to one or more of application servers 116-118, and processes the subsequent message as if the corresponding application servers 116-118 are not involved in the session. Session control function 112 thus advantageously avoids transmitting unnecessary subsequent messages to application servers 116-118, which saves bandwidth and processing time in communication network 100.

Figure 3:
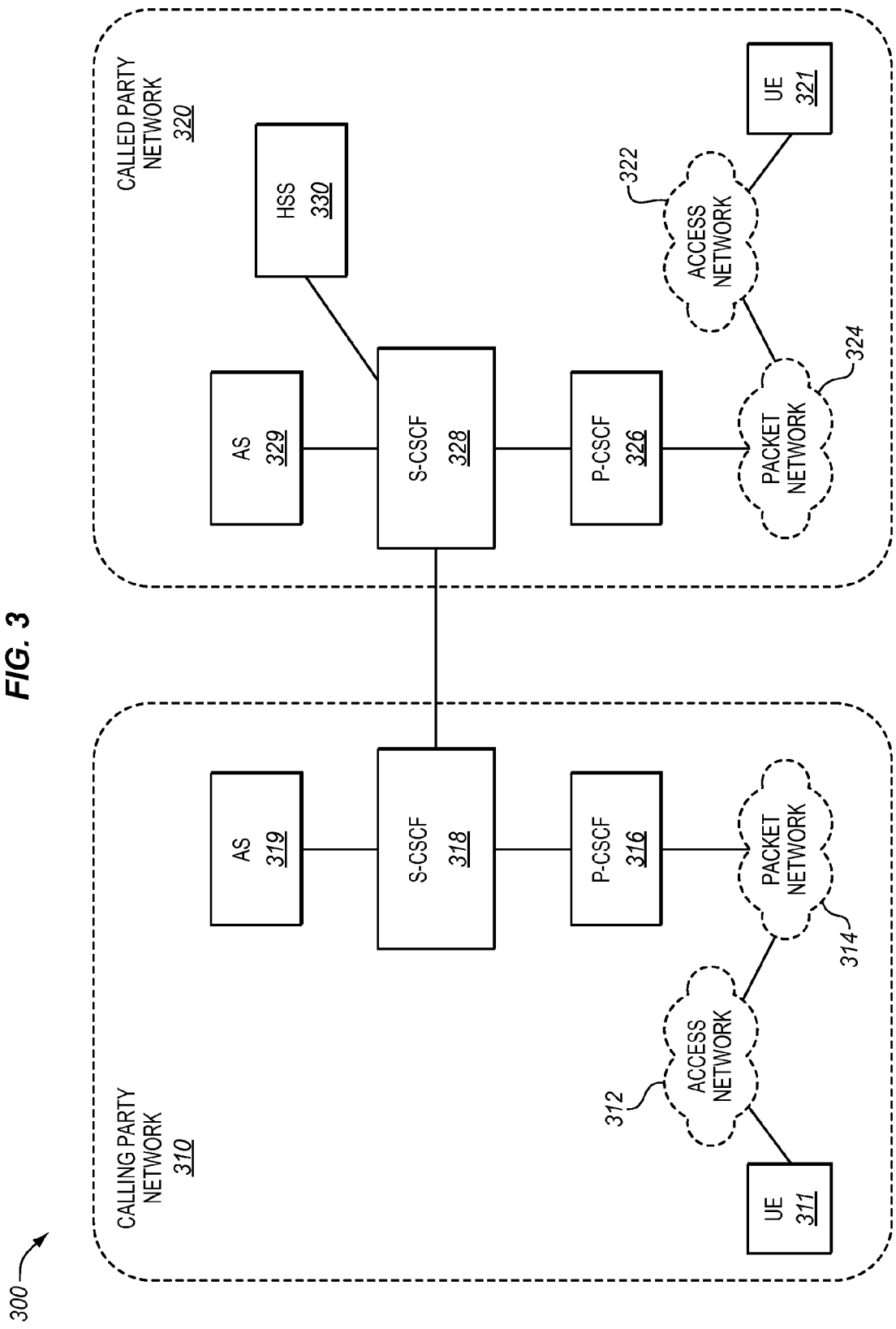
FIG. 3 illustrates an IMS network in an exemplary embodiment of the invention.

One type of communication network where service triggers may be dynamically defined by application servers is an IMS network. FIGS. 3-6 illustrate defining service triggers for different services in an IMS network. FIG. 3 illustrates an IMS network 300 in an exemplary embodiment of the invention. IMS network 300 includes a calling party network 310 and a called party network 320. Calling party network 310 includes an access network 312, a packet network 314, a proxy-call session control function (P-CSCF) 316, a serving-call session control function (S-CSCF) 318, and an application server 319. Called party network 320 includes an access network 322, a packet network 324, a P-CSCF 326, an S-CSCF 328, an application server 329, and a Home Subscriber Server (HSS) 330.

Figure 4:
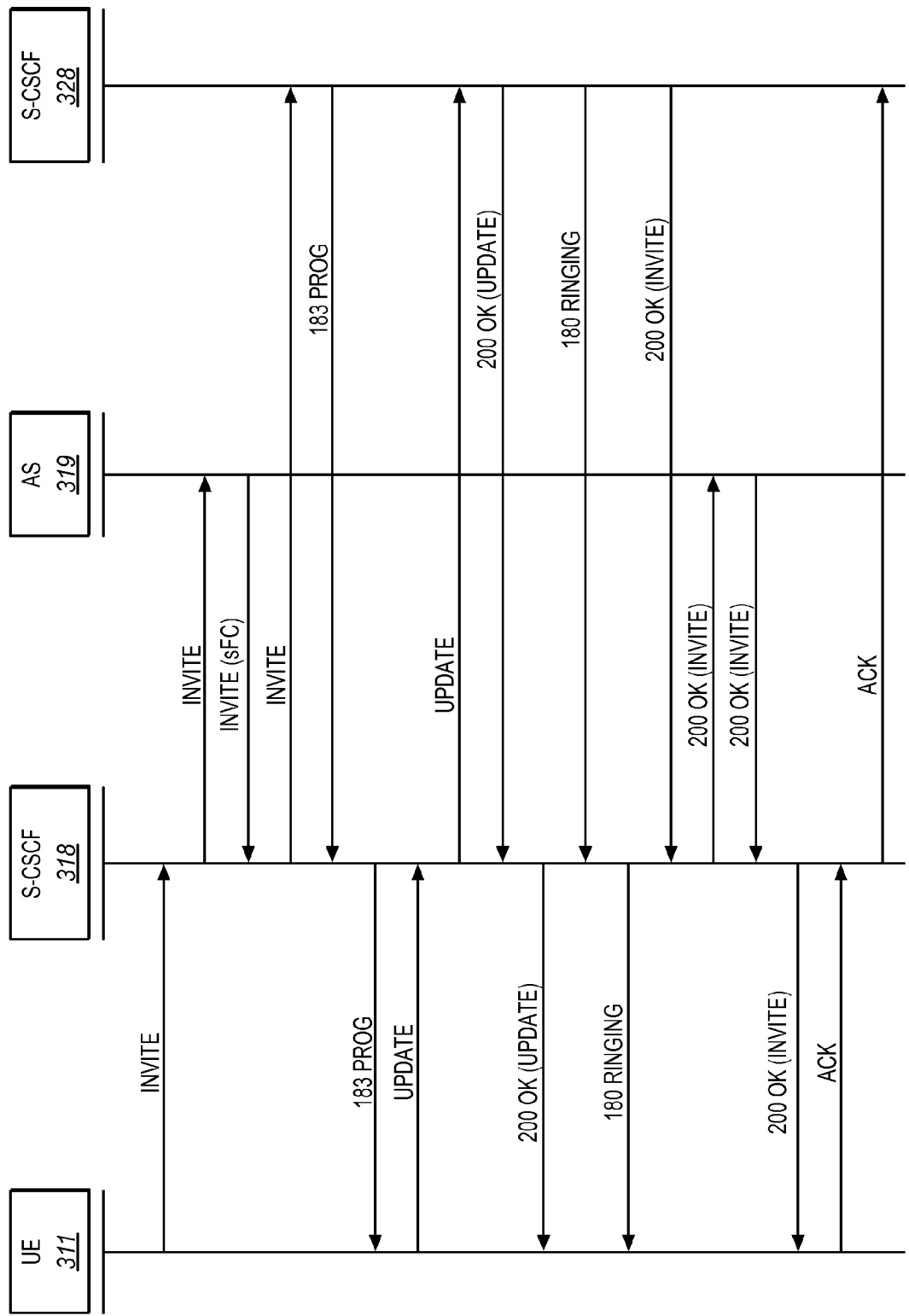
FIG. 4 is a message diagram illustrating messaging in an IMS network to provide a prepaid service in an exemplary embodiment of the invention.

FIG. 4 is a message diagram illustrating messaging in IMS network 300 to provide a prepaid service in an exemplary embodiment of the invention. To start, user equipment (UE) 311 (see FIG. 3) places a call to UE 321. To place the call, UE 311 transmits a SIP INVITE request message to S-CSCF 318 through access network 312, packet network 314, and P-CSCF 316. Responsive to receiving the INVITE request message, S-CSCF 318 processes the iFC for UE 311 to determine whether the INVITE request message triggers the prepaid service provided by AS 319. S-CSCF 318 may have previously downloaded a user profile for UE 311 that includes the iFC from an HSS (not shown). In this example, the INVITE request message does trigger the prepaid service, so S-CSCF 318 transmits the INVITE request message to AS 319.

AS 319 processes the INVITE request message and identifies that UE 311 has prepaid service assigned. Based on service logic, AS 319 determines that it needs to know the call answer event to start charging and call end event to stop charging to provide the prepaid service. Thus, AS 319 constructs an sFC body that includes a service trigger for a subsequent SIP 200 OK (INVITE) response message for the session and a service trigger for a subsequent BYE message for the session. The 200 OK response message indicates the call answer event and the BYE message indicates the call end event. AS 319 then embeds the sFC body in the INVITE request message, and transmits the INVITE request message to S-CSCF 318 that includes the constructed sFC body.

Responsive to receiving the INVITE request message from AS 319, S-CSCF 318 checks whether the sFC body is included in the INVITE request message. In this call scenario, the sFC body is included, so S-CSCF 318 stores the content of the sFC information associated with the corresponding AS 319 and the necessary routing information in order to send the subsequent messages to AS 319 if needed. S-CSCF 318 then removes the sFC information from the INVITE request message and routes the INVITE request message to S-CSCF 328 of called party network 320.

At some point during call setup, S-CSCF 328 transmits a SIP 183 Session Progress response message to S-CSCF 318. S-CSCF 318 checks the 183 message against the sFC information stored for AS 319. In this embodiment, S-CSCF 318 does not find a service trigger for the 183 message, so S-CSCF 318 continues to forward the 183 message to UE 311 without transmitting the message to AS 319.

If precondition and resource reservation is used, then UE 311 transmits a SIP UPDATE request message to confirm bearer setup. S-CSCF 318 receives the UPDATE request message and checks the UPDATE request message against the sFC information stored for AS 319. In this embodiment, S-CSCF 318 does not find a service trigger for the UPDATE message, so S-CSCF 318 continues to forward the UPDATE request message to S-CSCF 328 of called party network 320 without transmitting the message to AS 319.

Responsive to the UPDATE request message, S-CSCF 328 transmits a SIP 200 OK (UPDATE) message to S-CSCF 318. S-CSCF 318 checks the 200 OK (UPDATE) message against the sFC information stored for AS 319. In this embodiment, S-CSCF 318 does not find a service trigger for the 200 OK (UPDATE) message, so S-CSCF 318 continues to forward the 200 OK (UPDATE) message to UE 311 without transmitting the message to AS 319.

During call setup in called party network 320, UE 321 receives alerting and S-CSCF 328 transmits a 180 RINGING response message to S-CSCF 318. S-CSCF 318 checks the 180 RINGING response message against the sFC information stored for AS 319. In this embodiment, S-CSCF 318 does not find a service trigger for the 180 RINGING response message, so S-CSCF 318 continues to forward the 180 RINGING response message to UE 311 without transmitting the message to AS 319.

If the user of UE 321 answers the call, then S-CSCF 328 transmits a 200 OK (INVITE) response message to S-CSCF 318. S-CSCF 318 checks the 200 OK (INVITE) response message against the sFC information stored for AS 319. In this embodiment, S-CSCF 318 finds a service trigger for the 200 OK (INVITE) response message, so S-CSCF 318 transmits the 200 OK (INVITE) response message to AS 319 using the routing information previously obtained for routing the initial INVITE request message to AS 319.

AS 319 receives the 200 OK (INVITE) response message and identifies a call answer event. AS 319 may then begin charging for the prepaid service. AS 319 also transmits the 200 OK (INVITE) response message to S-CSCF 318. S-CSCF 318 continues to forward the 200 OK (INVITE) response message to UE 311. UE 311 responds to the 200 OK (INVITE) response message with a SIP ACK message. S-CSCF 318 receives the ACK message and checks the ACK message against the sFC information stored for AS 319. In this embodiment, S-CSCF 318 does not find a service trigger for the ACK message, so S-CSCF 318 continues to forward the ACK message to S-CSCF 328 of called party network 320 without transmitting the message to AS 319. The session is then established between UE 311 and UE 321.

When multiple application servers are involved in a session, these multiple application servers are triggered from S-CSCF 318 based on the priority of the iFC data. If multiple application servers apply the dynamic service triggering with an sFC body sent to S-CSCF 318, then S-CSCF 318 will associate the sFC data with the corresponding application server. Different mechanisms may be used for this correlation. S-CSCF 318 will not need to handle multiple sFC bodies at the same time, because after processing the request message from one application server and sending the request message to next application server, the sFC body associated with the previous application server will be stored and removed from the request message. When a subsequent message for the session is received, S-CSCF 318 will check the message against the sFC data according to the sequence of application servers, and the output message from the previous application server for the session will be used as the input message for the next application server.

As is evident in this example, AS 319 defines service triggers as sFC information, and S-CSCF 318 uses the service triggers to determine which subsequent messages to transmit to AS 319. As a result, AS 319 only receives the subsequent messages that are relevant to the prepaid service being provided by AS 319 and not other messages that are not relevant.

Figure 5:
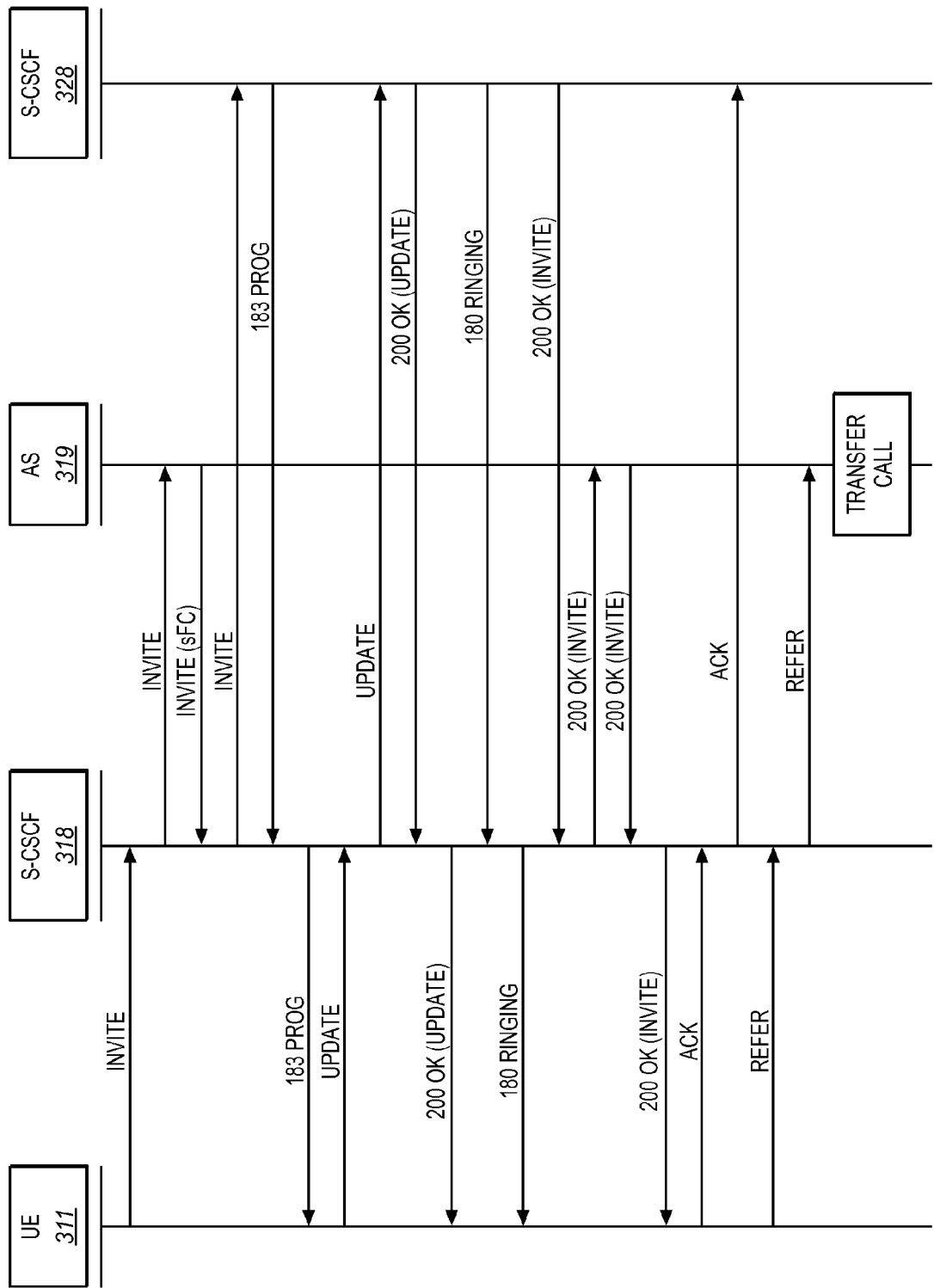
FIG. 5 is a message diagram illustrating messaging in an IMS network to provide a call transfer service in an exemplary embodiment of the invention.

FIG. 5 is a message diagram illustrating messaging in IMS network 300 to provide a call transfer service in an exemplary embodiment of the invention. To start, UE 311 (see FIG. 3) places a call to UE 321. To place the call, UE 311 transmits a SIP INVITE request message to S-CSCF 318 through access network 312, packet network 314, and P-CSCF 316. Responsive to receiving the INVITE request message, S-CSCF 318 processes the iFC for UE 311 to determine whether the INVITE request message triggers the call transfer service provided by AS 319. In this example, the INVITE request message does trigger the call transfer service, so S-CSCF 318 transmits the INVITE request message to AS 319.

AS 319 processes the INVITE request message and identifies that UE 311 has the call transfer service assigned. Based on service logic, AS 319 determines that it needs to know the call answer event and the call transfer invocation event to provide the call transfer service. Thus, AS 319 constructs an sFC body that includes a service trigger for a subsequent SIP 200 OK (INVITE) response message for the session and a service trigger for a subsequent REFER message for the session. The 200 OK response message indicates the call answer event and the REFER message indicates the call transfer invocation event. AS 319 then embeds the sFC body in the INVITE request message, and transmits the INVITE request message to S-CSCF 318 that includes the constructed sFC body.

Responsive to receiving the INVITE request message from AS 319, S-CSCF 318 checks whether the sFC body is included in the INVITE request message. In this call scenario, the sFC body is included, so S-CSCF 318 stores the content of the sFC information associated with the corresponding AS 319 and the necessary routing information in order to send the subsequent messages to AS 319 if needed. S-CSCF 318 then removes the sFC information from the INVITE request message and routes the INVITE request message to S-CSCF 328 of called party network 320.

At some point during call setup, S-CSCF 328 transmits a SIP 183 Session Progress response message to S-CSCF 318. S-CSCF 318 checks the 183 message against the sFC information stored for AS 319. In this embodiment, S-CSCF 318 does not find a service trigger for the 183 message, so S-CSCF 318 continues to forward the 183 message to UE 311 without transmitting the message to AS 319.

If precondition and resource reservation is used, then UE 311 transmits a SIP UPDATE request message to confirm bearer setup. S-CSCF 318 receives the UPDATE request message and checks the UPDATE request message against the sFC information stored for AS 319. In this embodiment, S-CSCF 318 does not find a service trigger for the UPDATE message, so S-CSCF 318 continues to forward the UPDATE request message to S-CSCF 328 of called party network 320 without transmitting the message to AS 319.

Responsive to the UPDATE message, S-CSCF 328 transmits a SIP 200 OK (UPDATE) message to S-CSCF 318. S-CSCF 318 checks the 200 OK (UPDATE) message against the sFC information stored for AS 319. In this embodiment, S-CSCF 318 does not find a service trigger for the 200 OK (UPDATE) message, so S-CSCF 318 continues to forward the 200 OK (UPDATE) message to UE 311 without transmitting the message to AS 319.

During call setup in called party network 320, UE 321 receives alerting and S-CSCF 328 transmits a 180 RINGING response message to S-CSCF 318. S-CSCF 318 checks the 180 RINGING response message against the sFC information stored for AS 319. In this embodiment, S-CSCF 318 does not find a service trigger for the 180 RINGING response message, so S-CSCF 318 continues to forward the 180 RINGING response message to UE 311 without transmitting the message to AS 319.

If the user of UE 321 answers the call, then S-CSCF 328 transmits a 200 OK (INVITE) response message to S-CSCF 318. S-CSCF 318 checks the 200 OK (INVITE) response message against the sFC information stored for AS 319. In this embodiment, S-CSCF 318 finds a service trigger for the 200 OK (INVITE) response message, so S-CSCF 318 transmits the 200 OK (INVITE) response message to AS 319 using the routing information previously obtained for routing the initial INVITE request message to AS 319.

AS 319 receives the 200 OK (INVITE) response message and identifies a call answer event. AS 319 may then identify that a call has been established. AS 319 also transmits the 200 OK (INVITE) response message to S-CSCF 318. S-CSCF 318 continues to forward the 200 OK (INVITE) response message to UE 311. UE 311 responds with a SIP ACK message. S-CSCF 318 receives the ACK message and checks the ACK message against the sFC information stored for AS 319. In this embodiment, S-CSCF 318 does not find a service trigger for the ACK message, so S-CSCF 318 continues to forward the ACK message to S-CSCF 328 of called party network 320 without transmitting the message to AS 319. The session is then established between UE 311 and UE 321.

Assume at some point during the call that UE 311 wants to transfer the call from UE 321 to another UE (not shown). To transfer the call, UE 311 transmits a SIP REFER request message to S-CSCF 318. The REFER message includes a destination number for the call transfer. S-CSCF 318 checks the REFER request message against the sFC information stored for AS 319. In this embodiment, S-CSCF 318 finds a service trigger for the REFER request message, so S-CSCF 318 transmits the REFER request message to AS 319 using the routing information previously obtained for routing the initial INVITE request message to AS 319. AS 319 receives the REFER request message and identifies a call transfer invocation event. AS 319 may then initiate the transfer of the call from UE 321 to the other UE identified by the destination number in the REFER request message.

As is evident in this example, AS 319 defines service triggers as sFC information, and S-CSCF 318 uses the service triggers to determine which subsequent messages to transmit to AS 319. As a result, AS 319 only receives the subsequent messages that are relevant to the call transfer service being provided by AS 319 and not other messages that are not relevant.

Figure 6:
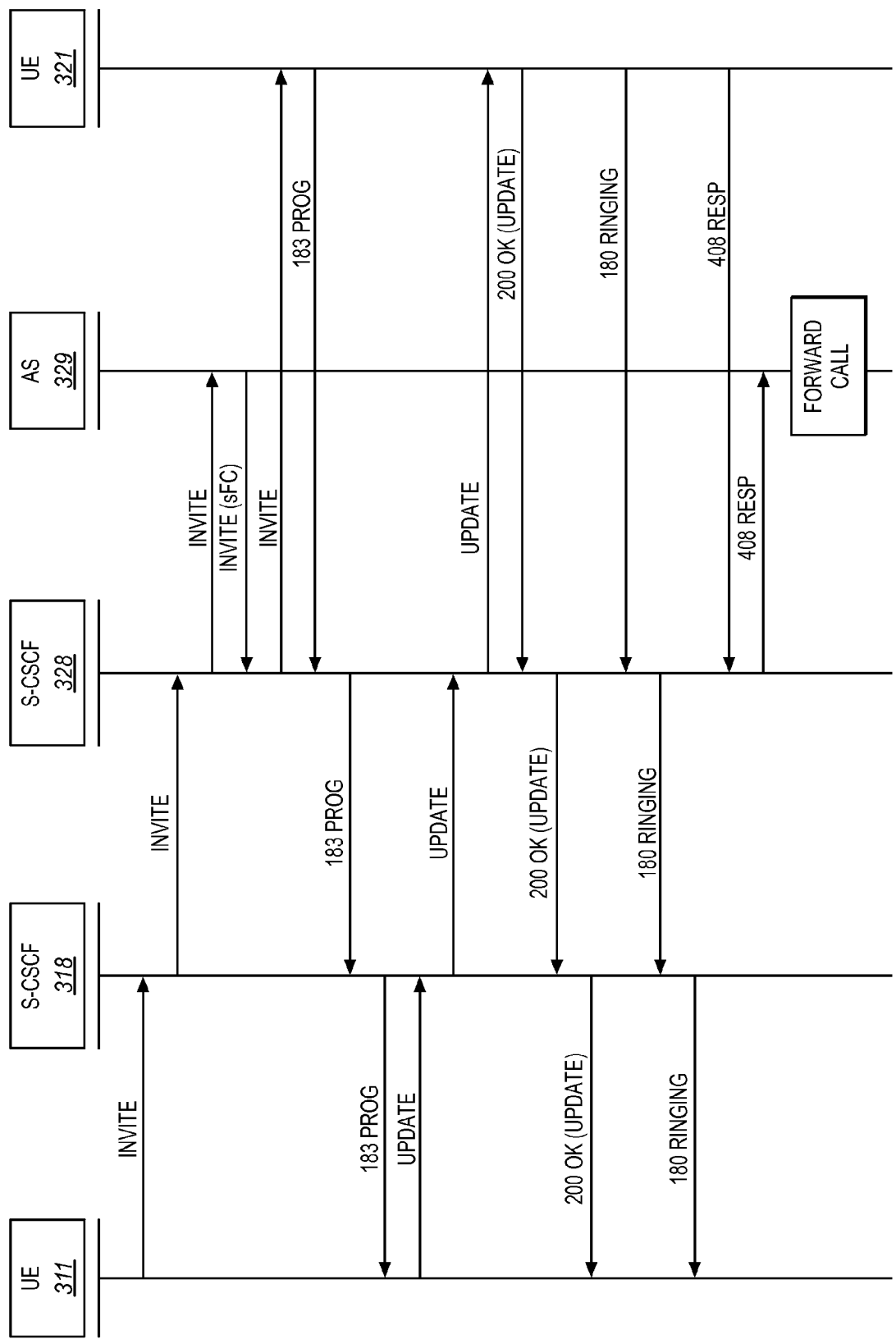
FIG. 6 is a message diagram illustrating messaging in an IMS network to provide a call forwarding no answer service in an exemplary embodiment of the invention.

FIG. 6 is a message diagram illustrating messaging in IMS network 300 to provide a call forwarding no answer service in an exemplary embodiment of the invention. To start, UE 311 (see FIG. 3) places a call to UE 321. To place the call, UE 311 transmits a SIP INVITE request message to S-CSCF 318 through access network 312, packet network 314, and P-CSCF 316. S-CSCF 318 forwards the INVITE message to S-CSCF 328 of called party network 320. Responsive to receiving the INVITE request message, S-CSCF 328 processes the iFC for UE 321 to determine whether the INVITE request message triggers the call forwarding no answer service provided by AS 329. In this example, the INVITE request message does trigger the call forwarding no answer service, so S-CSCF 328 transmits the INVITE request message to AS 329.

AS 329 processes the INVITE request message and identifies that the user of UE 321 has call forwarding no answer service activated at this time. Based on service logic, AS 329 determines that it needs to know the terminating party no answer event and the call answer event to provide the call forwarding no answer service. Thus, AS 329 constructs an sFC body that includes a service trigger for a subsequent SIP 408 Request Timeout response message for the session and a service trigger for a subsequent 200 OK (INVITE) response message for the session. The 408 Request Timeout response message indicates the no answer event and the 200 OK response message indicates the call answer event. AS 329 then embeds the sFC body in the INVITE request message, and transmits the INVITE request message to S-CSCF 328 that includes the constructed sFC body.

Responsive to receiving the INVITE request message from AS 329, S-CSCF 328 checks whether the sFC body is included in the INVITE request message. In this call scenario, the sFC body is included, so S-CSCF 328 stores the content of sFC information associated with the corresponding AS 329 and the necessary routing information in order to send the subsequent messages to AS 329 if needed. S-CSCF 328 then removes the sFC information from the INVITE request message and routes the INVITE request message to UE 321.

At some point of call setup, UE 321 transmits a SIP 183 Session Progress response message to S-CSCF 328. S-CSCF 328 checks the 183 message against the sFC information stored for AS 329. In this embodiment, S-CSCF 328 does not find a service trigger for the 183 message, so S-CSCF 328 continues to forward the 183 message to UE 311 (through S-CSCF 318) without transmitting the message to AS 329.

If precondition and resource reservation is used, then UE 311 transmits a SIP UPDATE request message to confirm bearer setup. S-CSCF 328 receives the UPDATE request message and checks the UPDATE request message against the sFC information stored for AS 329. In this embodiment, S-CSCF 328 does not find a service trigger for the UPDATE message, so S-CSCF 328 continues to forward the UPDATE request message to UE 321 without transmitting the message to AS 329.

Responsive to the UPDATE request message, UE 321 transmits a SIP 200 OK (UPDATE) message to S-CSCF 328. S-CSCF 328 checks the 200 OK (UPDATE) message against the sFC information stored for AS 329. In this embodiment, S-CSCF 328 does not find a service trigger for the 200 OK (UPDATE) message, so S-CSCF 328 continues to forward the 200 OK (UPDATE) message to UE 311 without transmitting the message to AS 329.

During call setup in called party network 320, UE 321 receives alerting and transmits a 180 RINGING response message to S-CSCF 328. S-CSCF 328 checks the 180 RINGING response message against the sFC information stored for AS 329. In this embodiment, S-CSCF 328 does not find a service trigger for the 180 RINGING response message, so S-CSCF 328 continues to forward the 180 RINGING response message to UE 311 without transmitting the message to AS 329.

If the user of UE 321 does not answer the call before the no answer timer on UE 321 expires, then UE 321 transmits a 408 response message to S-CSCF 328. S-CSCF 328 checks the 408 response message against the sFC information stored for AS 329. In this embodiment, S-CSCF 328 finds a service trigger for the 408 response message, so S-CSCF 328 transmits the 408 response message to AS 329 using the routing information previously obtained for routing the initial INVITE request message to AS 329. AS 329 receives the 408 response message and identifies a no answer event. AS 329 may then initiate forwarding of the call to a desired destination number.

As is evident in this example, AS 329 defines service triggers as sFC information, and S-CSCF 328 uses the service triggers to determine which subsequent messages to transmit to AS 329. As a result, AS 329 only receives the subsequent messages that are relevant to the call forwarding no answer service being provided by AS 329 and not other messages that are not relevant.

Figure 7:
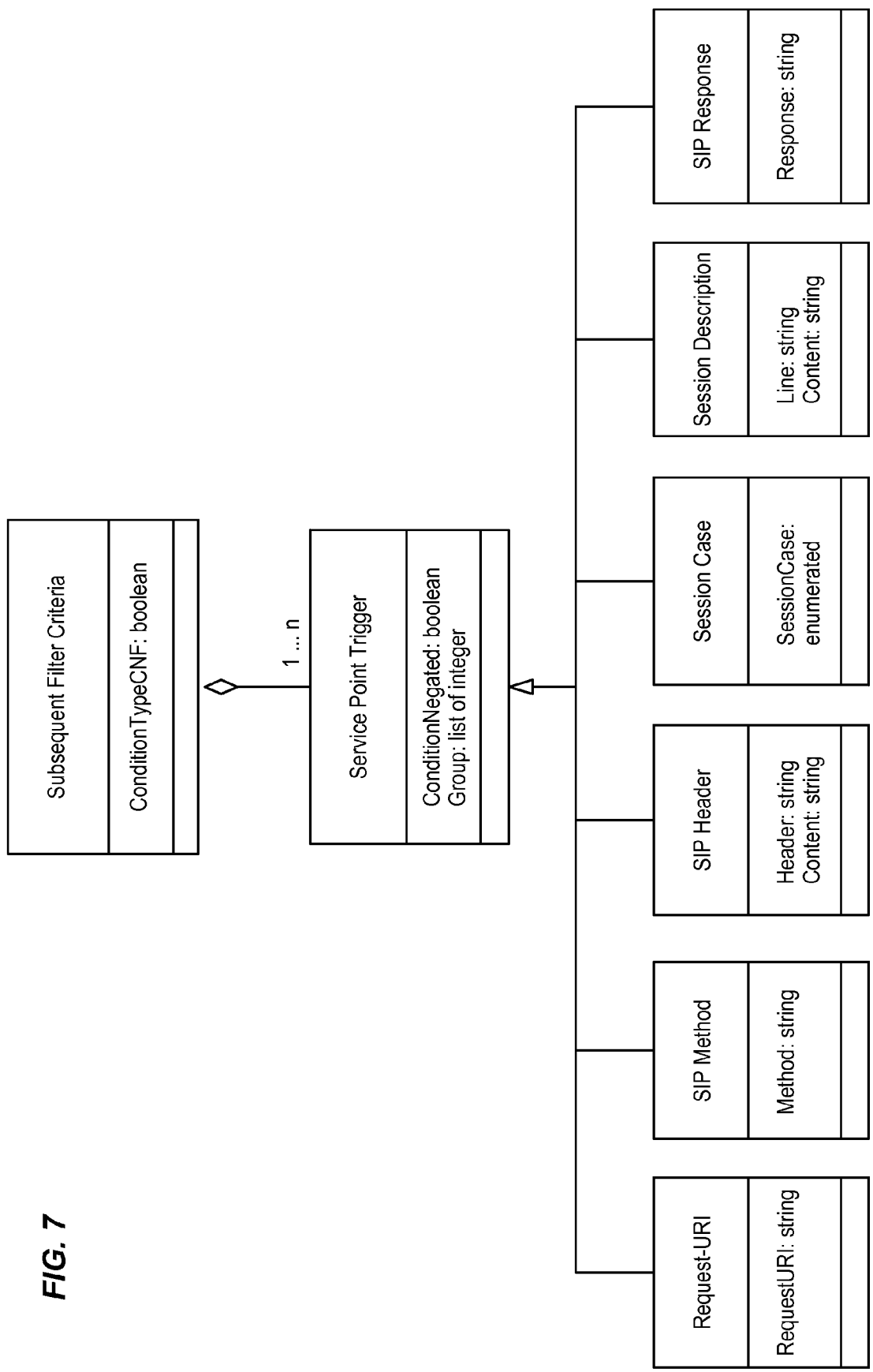
FIG. 7 illustrates an outline of the model for sFC information.

FIG. 7 illustrates an outline of the model for the sFC information as used in the above embodiments. The attribute "Group" of the class Service Point Trigger (SPT) allows the grouping of SPTs that will configure the sub-expressions inside a Conjunctive Normal Form (CNF) or Disjunctive Normal Form (DNF) expression. In CNF, the attribute "Group" identifies the OR'ed sets of SPT instances. If the SPT belongs to different OR'ed sets, then the SPT may have more than one "Group" value assigned. At least one "Group" is assigned for each SPT. In DNF, the attribute "Group" identifies the AND'ed sets of SPT instances. If the SPT belongs to different AND'ed sets, then the SPT may have more than one "Group" value assigned. At least one "Group" is assigned for each SPT. The attribute "ConditionNegated" of the class Service Point Trigger defines whether the individual SPT instance is negated (i.e., NOT logical expression).

The "Request-URI" class defines the SPT for the Request-URI, containing the attribute RequestURI. The "SIP Method" class defines SPT for the SIP method, containing the attribute Method which holds the name of any SIP method/request. The "SIP Header" class defines SPT for the presence or absence of any SIP header or for the content of any SIP header, containing the attribute Header which identifies the SIP Header (which is the SPT) and the Content attribute defining the value of the SIP Header if required. The absence of the Content attribute and ConditionNegated=TRUE indicates that the SPT is the absence of a determined SIP header. The "Session Case" class represents an enumerated type, with possible values "Originating" and "Terminating" indicating if the filter should be used by the S-CSCF handling the originating or terminating services. The "Session Description" class defines SPT for the content of any SDP field within the body of a SIP message. The "Line" attribute identifies the line inside the session description. The "Content" attribute is a string defining the content of the "Line" attribute. The "SIP Response" class defines SPT for the SIP response message, containing the attribute Response which holds the SIP response information.

Although specific embodiments were described herein, the scope of the invention is not limited to those specific embodiments. The scope of the invention is defined by the following claims and any equivalents thereof.

The invention claimed is:

1. A communication network, comprising:
   at least one application server; and
   a session control function adapted to receive a session initiation message for a session in the communication network, identify at least one initial service trigger for the session, and transmit the session initiation message to the at least one application server based on the at least one initial service trigger;
   the at least one application server being adapted to process the session initiation message to generate at least one subsequent service trigger for a service provided by the at least one application server for the session, and transmit the at least one subsequent service trigger to the session control function;
   the session control function being further adapted to receive a subsequent message for the session, and process the subsequent message and the at least one subsequent service trigger to determine whether to transmit the subsequent message to the at least one application server.

2. The communication network of claim 1 wherein the at least one application server is further adapted to:
   process the session initiation message to generate subsequent filter criteria indicating the at least one subsequent service trigger.

3. The communication network of claim 2 wherein the at least one application server is further adapted to:
   format a subsequent filter criteria body;
   embed the subsequent filter criteria body in the session initiation message; and
   transmit the session initiation message to the session control function.

4. The communication network of claim 3 wherein the session control function is further adapted to:
   strip the subsequent filter criteria body from the session initiation message before forwarding the session initiation message to a terminating device.

5. The communication network of claim 1 wherein the session control function comprises a serving-call session control function (S-CSCF) of an IMS network.

6. The communication network of claim 1 wherein the at least one initial service trigger comprises initial filter criteria.

7. A method comprising:
   receiving a session initiation message for a session in a session control function of a communication network;
   identifying at least one initial service trigger for the session in the session control function;
   transmitting the session initiation message to at least one application server based on the at least one initial service trigger;
   processing the session initiation message in the at least one application server to generate at least one subsequent service trigger for a service provided by the at least one application server for the session;
   transmitting the at least one subsequent service trigger from the at least one application server to the session control function;
   receiving a subsequent message for the session in the session control function; and
   processing the subsequent message and the at least one subsequent service trigger in the session control function to determine whether to transmit the subsequent message to the at least one application server.

8. The method of claim 7 wherein processing the session initiation message to define at least one subsequent service trigger comprises:

processing the session initiation message to generate subsequent filter criteria indicating the at least one subsequent service trigger.

9. The method of claim 8 wherein processing the session initiation message to define at least one subsequent service trigger comprises:
formatting a subsequent filter criteria body in the at least one application server.

10. The method of claim 9 wherein transmitting the at least one subsequent service trigger from the at least one application server to the session control function comprises:
embedding the subsequent filter criteria body in the session initiation message; and
transmitting the session initiation message from the at least one application server to the session control function.

11. The method of claim 10 further comprising:
stripping the subsequent filter criteria body from the session initiation message in the session control function before forwarding the session initiation message to a terminating device.

12. The method of claim 7 wherein the session control function comprises a serving-call session control function (S-CSCF) of an IMS network.

13. The method of claim 7 wherein the at least one initial service trigger comprises initial filter criteria.

14. An IMS network, comprising:
at least one application server; and
a serving-call session control function (S-CSCF) adapted to receive a session initiation message for a session in the IMS network, identify initial filter criteria for the session, and transmit the session initiation message to the at least one application server based on the initial filter criteria;
the at least one application server being adapted to process the session initiation message to generate subsequent filter criteria for a service provided by the at least one application server for the session, and transmit the subsequent filter criteria to the S-CSCF;
the S-CSCF being further adapted to receive a subsequent message for the session, and process the subsequent message and the subsequent filter criteria to determine whether to transmit the subsequent message to the at least one application server.

15. The IMS network of claim 14 wherein subsequent filter criteria includes at least one subsequent service trigger.

16. The IMS network of claim 15 wherein the at least one application server is further adapted to:
format a subsequent filter criteria body in XML format;
embed the subsequent filter criteria body in the session initiation message; and
transmit the session initiation message to the S-CSCF.

17. The IMS network of claim 16 wherein the session initiation message comprises a SIP INVITE request message.

18. The IMS network of claim 16 wherein the S-CSCF is further adapted to:
strip the subsequent filter criteria body from the session initiation message before forwarding the session initiation message to a terminating device.

19. A method of operating an application server in a communication network, the method comprising:
receiving, in the application server, a session initiation message for a session from a session control function [in the application server]responsive to the session control function processing initial filter criteria for the session;
processing, in the application server, the session initiation message to generate at least one subsequent service trigger for a service provided by the application server for the session; and
transmitting the at least one subsequent service trigger from the application server to the session control function [for the session control function to process in response to receiving a subsequent message for the session], wherein the at least one subsequent service trigger is configured for the session control function to process, in response to receiving a subsequent message for the session, to determine whether to transmit the subsequent message to the application server.

20. A method of operating a session control function in a communication network, the method comprising:
receiving a session initiation message for a session in the session control function;
identifying at least one initial service trigger for the session;
transmitting the session initiation message from the session control function to at least one application server based on the at least one initial service trigger;
receiving at least one subsequent service trigger in the session control function from the at least one application server, wherein the at least one subsequent service trigger is generated by the at least one application server;
receiving a subsequent message for the session in the session control function; and
processing the subsequent message and the at least one subsequent service trigger in the session control function to determine whether to transmit the subsequent message to the at least one application server.

* * * * *

UNITED STATES PATENT AND TRADEMARK OFFICE
CERTIFICATE OF CORRECTION

PATENT NO. : 7,877,487 B2  
APPLICATION NO. : 11/618302  
DATED : January 25, 2011  
INVENTOR(S) : Cai et al.

Page 1 of 1

It is certified that error appears in the above-identified patent and that said Letters Patent is hereby corrected as shown below:

In column 14, lines 11-29, the text of claim 19

"A method of operating an application server in a communication network, the method comprising: receiving, in the application server, a session initiation message for a session from a session control function [in the application server]responsive to the session control function processing initial filter criteria for the session; processing, in the application server, the session initiation message to generate at least one subsequent service trigger for a service provided by the application server for the session; and transmitting the at least one subsequent service trigger from the application server to the session control function [for the session control function to process in response to receiving a subsequent message for the session], wherein the at least one subsequent service trigger is configured for the session control function to process, in response to receiving a subsequent message for the session, to determine whether to transmit the subsequent message to the application server."

should read

"A method of operating an application server in a communication network, the method comprising: receiving, in the application server, a session initiation message for a session from a session control function responsive to the session control function processing initial filter criteria for the session; processing, in the application server, the session initiation message to generate at least one subsequent service trigger for a service provided by the application server for the session; and transmitting the at least one subsequent service trigger from the application server to the session control function, wherein the at least one subsequent service trigger is configured for the session control function to process, in response to receiving a subsequent message for the session, to determine whether to transmit the subsequent message to the application server."

Signed and Sealed this
Twelfth Day of April, 2011

David J. Kappos
*Director of the United States Patent and Trademark Office*